(12) United States Patent
Hoernicke et al.

(10) Patent No.: US 11,961,386 B2
(45) Date of Patent: Apr. 16, 2024

(54) COMPUTER-IMPLEMENTED METHOD FOR DETERMINING AN OPERATIONAL STATE OF AN INDUSTRIAL PLANT

(71) Applicant: ABB Schweiz AG, Baden (CH)

(72) Inventors: Mario Hoernicke, Landau (DE); Katharina Stark, Weinheim (DE); Dirk Schulz, Meckenheim (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/894,728

(22) Filed: Aug. 24, 2022

(65) Prior Publication Data

US 2022/0415158 A1 Dec. 29, 2022

Related U.S. Application Data

(63) Continuation of application No. PCT/EP2020/054786, filed on Feb. 24, 2020.

(51) Int. Cl.
*G08B 23/00* (2006.01)
*G05B 19/418* (2006.01)
*G08B 21/18* (2006.01)

(52) U.S. Cl.
CPC .......... *G08B 23/00* (2013.01); *G05B 19/418* (2013.01); *G08B 21/18* (2013.01)

(58) Field of Classification Search
CPC ...... G08B 23/00; G08B 21/18; G05B 19/418; G05B 2219/31437; G05B 23/0278; G05B 2219/24123; G05B 2219/31438; G05B 23/0272

See application file for complete search history.

(56) References Cited

U.S. PATENT DOCUMENTS 4,122,136 A * 10/1978 Korte ................... C08F 263/04
526/64
4,749,985 A * 6/1988 Corsberg ............... G08B 23/00
701/99

(Continued)

FOREIGN PATENT DOCUMENTS

EP          3474105 A1     4/2019
WO     2016/164701 A1    10/2016

OTHER PUBLICATIONS

European Patent Office, International Search Report in International Patent Application No. PCT/EP2020/054786, 5 pp. (dated Jun. 3, 2020).

(Continued)

*Primary Examiner* — Steven Lim
*Assistant Examiner* — Son M Tang
(74) *Attorney, Agent, or Firm* — Leydig, Voit & Mayer, Ltd.

(57) ABSTRACT

A computer-implemented method for determining an operational state of an industrial plant includes acquiring alarms raised within the plant and adding them to a pool of important alarms, determining whether a physical state of the plant indicated by a first alarm causes a second alarm or meets a predetermined state-dependent condition and, if so, moving the first alarm to a pool of informative alarms; and determining the operational state of the plant and/or a corrective action for improving this operational state based on the alarms in the pool of important alarms.

22 Claims, 2 Drawing Sheets

(56) References Cited

U.S. PATENT DOCUMENTS

| | | | | |
|---|---|---|---|---|
| 4,836,685 A * | 6/1989 | Verreault | B01F 35/881 | 700/265 |
| 5,581,242 A * | 12/1996 | Arita | G05B 23/0272 | 706/53 |
| 2002/0055790 A1* | 5/2002 | Havekost | G05B 23/0272 | 700/80 |
| 2006/0190584 A1* | 8/2006 | Skold | G05B 23/0272 | 719/318 |
| 2008/0004723 A1 | 1/2008 | Fax et al. | | |
| 2008/0208373 A1* | 8/2008 | Thurau | G05B 23/027 | 700/80 |
| 2010/0019894 A1* | 1/2010 | Okada | G05B 23/0272 | 340/506 |
| 2010/0219107 A1* | 9/2010 | Parsche | C10G 1/00 | 208/402 |
| 2010/0289638 A1* | 11/2010 | Borchers | G05B 23/0272 | 340/506 |
| 2011/0230837 A1* | 9/2011 | Kamen | A61M 39/14 | 340/687 |
| 2013/0015967 A1* | 1/2013 | Nagathil | G05B 23/0272 | 340/506 |
| 2013/0063264 A1* | 3/2013 | Oktem | G06F 16/122 | 706/50 |
| 2014/0097952 A1* | 4/2014 | Shaw | G05B 23/0272 | 340/517 |
| 2015/0379864 A1* | 12/2015 | Janchookiat | G06F 11/327 | 340/506 |
| 2016/0300475 A1* | 10/2016 | Childs | G05B 23/0278 | |
| 2017/0270414 A1* | 9/2017 | Ignatova | G01R 19/2513 | |
| 2019/0048100 A1* | 2/2019 | Mason | A01N 25/02 | |
| 2019/0114897 A1* | 4/2019 | Tappan | G08B 21/18 | |
| 2019/0369131 A1* | 12/2019 | Akase | G01N 33/4905 | |
| 2020/0011908 A1* | 1/2020 | Bickel | H02J 13/0004 | |
| 2020/0013277 A1* | 1/2020 | Bickel | G08B 29/181 | |

OTHER PUBLICATIONS

European Patent Office, Written Opinion in International Patent Application No. PCT/EP2020/054786, 7 pp. (dated Jun. 3, 2020).
European Patent Office, International Preliminary Report on Patentability in International Patent Application No. PCT/EP2020/054786, 8 pp. (dated Aug. 11, 2021).

* cited by examiner

COMPUTER-IMPLEMENTED METHOD FOR DETERMINING AN OPERATIONAL STATE OF AN INDUSTRIAL PLANT

CROSS-REFERENCE TO RELATED APPLICATIONS

This patent application claims priority to International Patent Application No. PCT/EP2020/054786, filed on Feb. 24, 2020, which is incorporated herein in its entirety by reference.

FIELD OF THE DISCLOSURE

The present disclosure relates to the determining of an operational state of an industrial plant from a plurality of alarms that are raised within the plant.

BACKGROUND OF THE INVENTION

Industrial plants typically execute a given process according to a given engineered recipe that sets out which actions are to be performed in which order. The successful execution of the process, and in particular the quality of the finally obtained product, may critically depend on whether the given recipe is adhered to. Therefore, an industrial plant needs to be monitored in many places in order to detect any deviations from the recipe, as well as equipment failure. Whenever something abnormal is detected, an alarm is raised.

By raising an alarm, the industrial plant calls for the attention of the plant operator, so that the operator may perform corrective action, such as changing a faulty part or cleaning a clogged vessel. However, during operation of a complex plant, very many alarms may be raised at any given time. Akin to log files generated in computing systems, the salient information may therefore be buried in a lot of noise, which makes it difficult to draw the right conclusions from the many alarms. In particular, a human operator faced with a flood of alarms may not even know where to start fixing the problem.

WO 2019/104 296 A1 discloses an alarm management system to assist an operator with identifying high priority alarms, based on the number of event occurrences.

BRIEF SUMMARY OF THE INVENTION

The present disclosure describes systems and methods for extracting, from a large set of alarms, those alarms that are particularly meaningful for the operational state of the plant, so that the operational state, and/or a corrective action for improving this operational state, may be readily determined.

Accordingly, in one embodiment, the present disclosure describes a computer-implemented method for determining an operational state of an industrial plant. The industrial plant is configured to execute a given industrial process, usually according to a given recipe. Such a recipe details the sequence in which actions are to be performed on one or more educts in order to manufacture one or more products. In particular, a topology of the plant, comprising the different pieces of equipment and interconnections between them, may be engineered to fit a previously engineered recipe.

Each piece of equipment may raise one or more alarms. The alarms that are raised most frequently are so-called "service alarms" and "process alarms."
Service alarms are raised in response to a service or an operation in the industrial plant being interrupted or being unable to start. In particular, an industrial plant may be composed of process modules that may be interconnected and separated from one another again, so that from a given set of physical process modules available on a site, different modular plants may be assembled to manufacture different products. In such a setting, each physical process module provides one or more services. When the topology of the plant is engineered according to the recipe for executing the process, a physical process module may be inserted in a particular place for the reason that it provides a service for which there is a concrete need according to the recipe.

For example, the services may specifically comprise one or more of: heating or cooling a substance, and/or keeping the temperature of the substance at a desired value; stirring a substance; filling at least one vessel with a desired amount of a substance; discharging a desired amount of a substance from at least one vessel; dosing a desired amount of a second substance into a first substance; intermixing a mixture of two or more substances by mechanical interaction with this mixture; distilling at least one substance from a mixture of two or more substances; transitioning at least one substance; and inertizing at least one substance.

When performing each physical action to provide a service, certain variables are monitored, and it is checked whether these variables meet predetermined conditions. If such a condition is met, a process alarm is raised. For example, process alarms may be raised in response to a temperature, a pressure, and/or a mass flow deviating from a nominal value or going beyond an upper or lower threshold value.

In particular, in modular industrial plants, each process module may be configured to monitor a mass flow and/or a pressure on each of its input and output ports. Each module by itself does not "know" with which other modules it will be interconnected, but monitoring mass flows and/or pressures on the ports nonetheless permits to detect many faults in the interoperation of interconnected process modules. For example, a module whose inner equipment is working all right may not get enough educts from an upstream module because a valve is closed, or a line is clogged. In this case, the pressure and mass flow at the input port of the working module may drop too low. Likewise, if something is amiss in a downstream module, the output port of the working module may be pumping against a closed valve in the input port of the downstream module. In this case, the pressure at the output port of the working module may climb too high, and the mass flow at this output port may drop to zero. At the same time, a temperature at this output port may climb too high if the mass flow is also supposed to transfer a heat flow to the downstream module.

Process alarms are an indication that something is amiss, but they do not necessarily mean that the overall operation of the industrial plant is affected. Specifically, the alarm thresholds for process alarms may be set relatively tight, so that, for example, an over-pressure may be physically tolerated by the plant for some time. If corrective action can be taken within that time, operation of the plant may continue uninterrupted.

Service alarms, however, mean that some concrete action that is supposed to be performed according to the recipe of the process cannot be performed. If the product of the service cannot be obtained from another source, like from another module connected in parallel with the faulty one, or from some reservoir, then the fault indicated by the service alarm may bring the industrial process as a whole to a halt.

Therefore, in the context of the industrial plant, service alarms may have a higher priority than process alarms, and so provide information useful to the systems and methods described herein.

BRIEF DESCRIPTION OF THE SEVERAL VIEWS OF THE DRAWING(S)

DETAILED DESCRIPTION OF THE INVENTION

Figure 1:
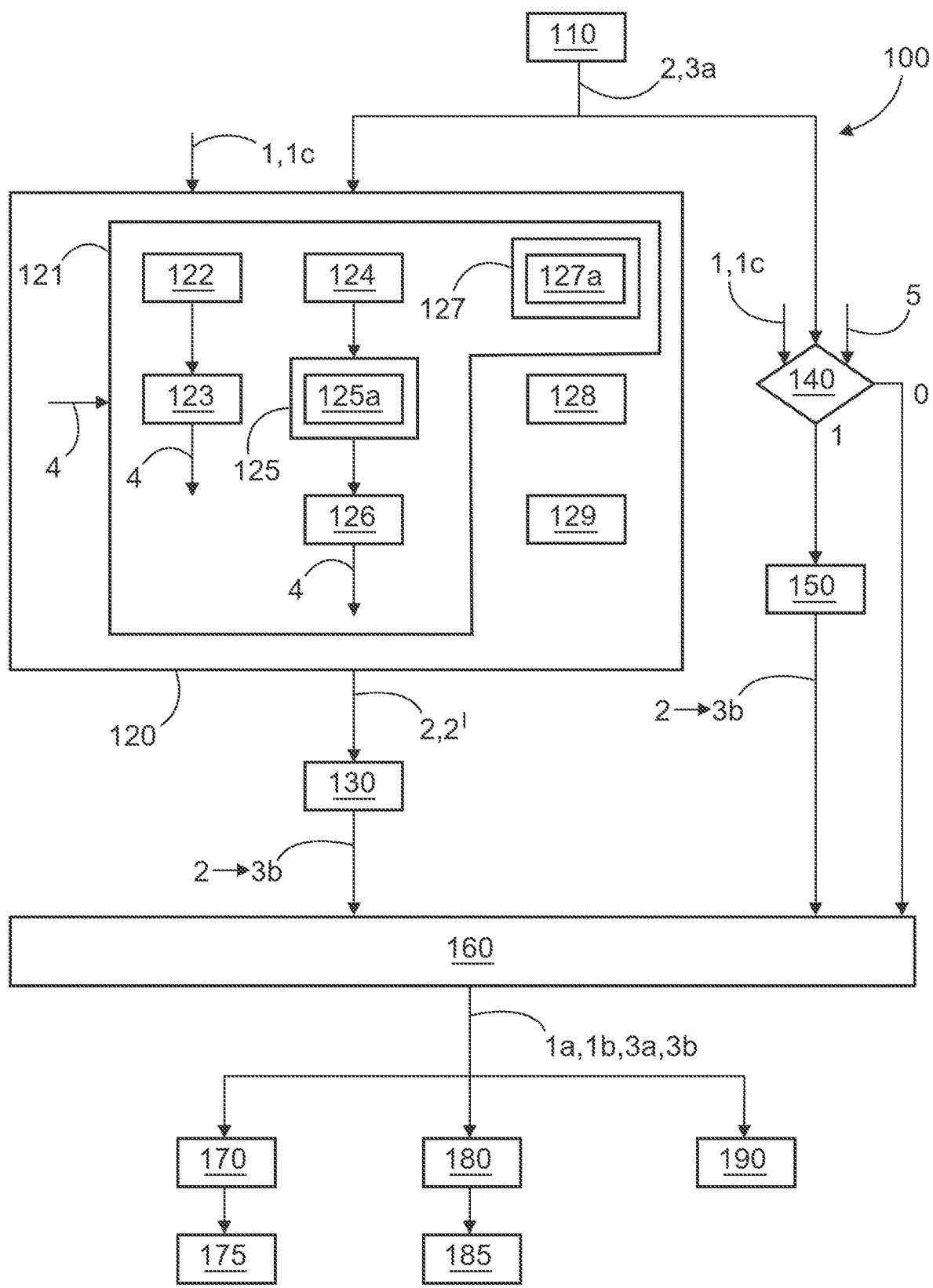
FIG. 1 is a flowchart for a method in accordance with the disclosure.

FIG. 1 is a schematic flow chart of an exemplary embodiment of a method 100, the method 100 being implemented for determining an operational state of an industrial plant. In step 110 of the method 100, a plurality of alarms 2 raised within the plant 1 is acquired. These alarms are initially all added to a pool 3a of important alarms 2.

In step 120, it is determined whether physical states 1c of the plant 1 indicated by first acquired alarms 2 have caused second alarms 2' that have also been acquired. Where such cause-effect pairs 2, 2' are found, the respective first alarm (the cause) 2 is moved to the pool 3b of informative alarms in step 130.

In step 140, it is determined whether an alarm 2 fulfils a condition 5 for not being relevant in the concrete physical state 1c of the plant 1 to which it pertains. If this is the case (truth value 1), this alarm 2 is moved to the pool 3b of informative alarms 2 in step 150.

In step 160, the operational state 1a of the plant 1, and/or a corrective action 1b for improving this operational state 1a, is determined based on the alarms 2 that are still in the pool 3a of important alarms 2 (i.e., alarms 2 that have not been moved to the pool 3b of informative alarms 2). The pool 3a of important alarms and the pool 3b of informative alarms remain available for further evaluation.

In step 170, representations of the alarms 2' in the pool 3a of important alarms 2 may be rendered on a display device. In step 175, hyperlinks from these alarms 2' to other alarms 2 that were moved to the pool 3b of informative alarms by virtue of these important alarms 2' may be provided.

In step 180, a representation of a physical state 1c that has caused an alarm 2 to be moved to the pool 3b of informative alarms 2 may be rendered on the display device. In step 185, a hyperlink to that alarm 2 may be provided.

In step 190, a control signal may be provided to at least one actuator of the plant, so as to move the plant 1 to a more favorable physical state 1c.

Inside box 120, embodiments are detailed as to how cause-effect relationships between alarms 2 and 2' may be established.

According to block 121, such relationships may be established based on a set of rules 4.

According to block 128, relationships are specifically established between process alarms 2b and service alarms 2a that are raised within a same physical process module 10, 10' that defines a set of available services.

According to block 129, the behavior of the plant 1 is simulated in order to establish cause-effect relationships.

Inside box 121, exemplary embodiments are detailed as to how rules 4 may be obtained.

According to block 122, resources utilized by a service or operation may be determined, and according to block 123, a rule may be created that in response to at least one process alarm 2b that this resource may raise, a service alarm 2a is to be raised.

According to block 124, it may be determined that a service or operation requires some particular state 1c of the plant 1 or a part thereof. According to block 125, it may be determined that the raising of a process alarm 2b will cause the plant 1 or part thereof to switch to a state 1c different from the required state 1c. In particular, this may, according to block 125a, be the outcome of a safety or interlock function in the topology of the plant 1. According to block 126, a rule 4 may be created that in response to the process alarm 2b being raised, a service alarm 2a is to be raised.

According to block 127, at least one rule 4 may be generated based at least in part on metadata of a process module interface. In particular, according to block 127a, the process module interface may specifically comprise at least one such rule 4.

Figure 2:
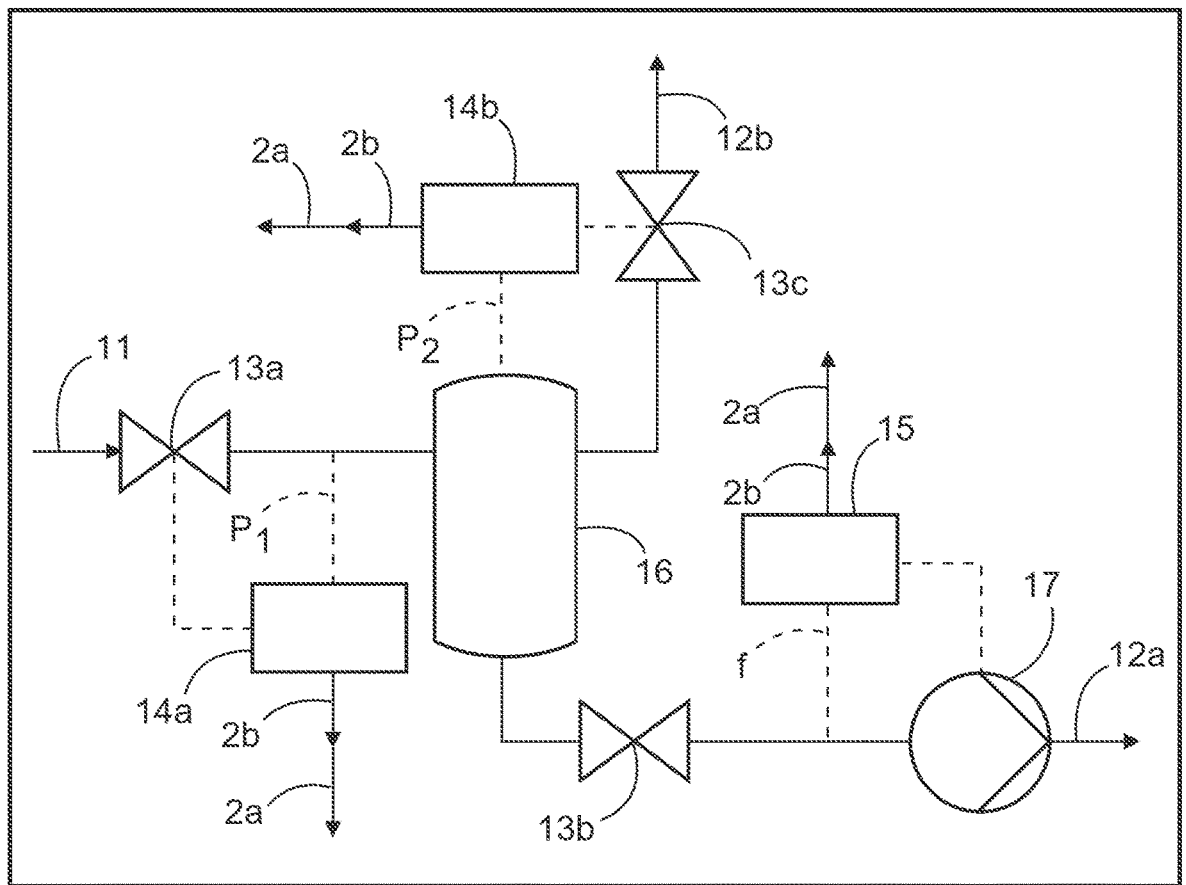
FIG. 2 is a diagram of an exemplary dosing module with sources for process alarms in accordance with the disclosure.

FIG. 2 shows an exemplary dosing module 10. The dosing module 10 is configured to take in a substance via its input port 11 and deliver defined quantities of it via its output port 12a. A buffer vessel 16 is provided to temporarily store the substance, so as to uncouple the speed and pressure with which the substance may be dosed to output port 12a from the speed and pressure with which the substance is available at input port 11. The dosed substance is pumped to the output port 12a by pump 17.

Thus, the dosing module 10 provides two services, i.e., possible actions: "Fill" and "Dose". To this end, the dosing module 10 has a first valve 13a in the line from the input port 11 to the buffer vessel 16 and a second valve 13b in the line from the buffer vessel 16 to the output port 12a. For safety, there is also a relief valve 13c in the line from the buffer vessel 16 to the relief port 12b.

The three basic parameters that need to be monitored in the dosing module 10 are the pressure $p_1$ in the line from the input port 11 to the buffer vessel 16, the pressure $p_2$ in the buffer vessel 16, and the mass flow f in the line from the buffer vessel 16 to the output port 12a.

The pressure $p_1$ is monitored by pressure sensor 14a. If the pressure $p_1$ climbs too high, then the valve 13a will be automatically closed, and a process alarm 2b will be raised. In this state, a further intake of substance will not be possible, so a service alarm 2a for the service "Fill" will be raised, and this causes the process alarm 2b to be moved to the pool 3b of informative alarms 2. If filling is in progress, it will be put on hold.

The pressure $p_2$ is monitored by pressure sensor 14b. If the pressure $p_2$ climbs too high, the valve 13c will be automatically opened, and a process alarm 2b will be raised. In this state, a further intake of substance will not be possible either, so again, a service alarm 2a for the service "Fill" will be raised, and if filling is in progress, it will be put on hold. The service alarm 2a will cause the process alarm 2b to be moved to the pool 3b of informative alarms 2.

The mass flow f is monitored by flow sensor 15. If the mass flow f drops too low, a process alarm 2b will be raised. In this state, a reliable dosing of substance is not possible, so a service alarm 2a for the service "Dose" will be raised, and pump 17 will be automatically stopped. If dosing is in progress, depending on the magnitude of the shortfall in mass flow f, it will be temporarily stopped, or it will be aborted altogether. The service alarm 2a will cause the process alarm 2b to be moved to the pool 3b of informative alarms 2.

Thus, the process alarms 2b raised by pressure sensors 14a and 14b may affect the service "Fill", and the process alarm 2a raised by mass flow sensor 15 may affect the service "Dose". Any process alarms 2b that do not affect a service for which there is a service alarm 2a (for example, over-pressure $p_2$ while there is a service alarm 2a for dosing) will remain in the pool 3a of important alarms 2.

The relationships between the different process alarms 2b on the one hand, and service alarms 2a, automatic actions on equipment and consequences for currently running services on the other hand, are all contained in the metadata in the process module interface according to the Module Type Package, MTP. This MTP also contains requirements for the operation of each service. For the service "Fill", the valve 13a in the filling line to the buffer vessel 16 must be open, but the relief valve 13c from this buffer vessel 16 to the relief port 12b must be closed. For the service "Dose", the valve 13b in the line to the pump 17 must be open, and the pump 17 must be running.

If the running of a service is intended, but one of the conditions for this service is not fulfilled for whatever reason (such as a valve being opened or closed due to a process alarm 2a, or a power failure at the pump 17), then a service alarm 2a for the respective service is raised. Note that in this example, the requirements for the services "Fill" and "Dose" do not contradict each other, so both services may run at the same time. If the running of a service is not intended, violation of the respective conditions will not cause a service alarm 2a.

Figure 3:
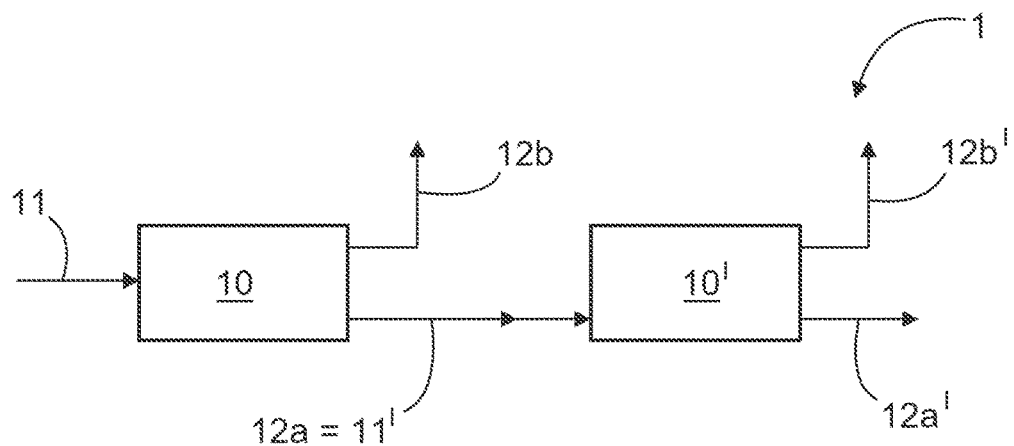
FIG. 3 is a diagram of an exemplary simple plant composed of two dosing modules in accordance with the disclosure.

FIG. 3 shows a very simple plant 1 composed of two dosing modules 10, 10'. The output port 12a of the first dosing module 10 is connected to the input port 11' of the second dosing module 10'. Like the first dosing module 10, the second dosing module 10' also has its output port 12a' and relief port 12b'.

As discussed before, alarms can propagate in this plant, for example, from the second dosing module 10' to the first dosing module 10. If the pressure pi in the second dosing module 10' climbs too high, then the valve 13a in the input port 11' will be closed. The source of this excess pressure is the active "Dose" service in the first dosing module 10. The high pressure p1 in the second dosing module 10' will affect the mass flow fin the first dosing module 10 because its pump 17 is pumping against the closed valve 13a in the input port 11' of the second dosing module 10'. This in turn will cause a service alarm 2a for the service "Dose" in the first dosing module 10.

From the examples presented above, it is evident that a single event, like a closed valve on the input port of one faulty module, may trigger multiple alarms, like the over-pressure, over-temperature and under-flow on the output port of the upstream module. On top of those alarms, the faulty module itself is likely to raise more process alarms, and if the fault cannot be compensated somehow, a service alarm may be raised. If all these alarms are presented to an operator, the operator may be overwhelmed by the information overflow and not know where to start fixing the problem. Likewise, if the operational state of the plant is evaluated by machine, it is difficult to extract the salient information from the noise.

The method that addresses this problem starts with acquiring a plurality of alarms raised within the plant. Initially, all these alarms are added to a pool of important alarms. Later, the operational state of the plant, and/or a corrective action for improving this operational state, will be determined based on the alarms in the pool of important alarms. But first, the alarms are filtered according to one or both of two criteria presented in the following, and this filtering results in some alarms being moved from the pool of important alarms to a pool of informative alarms. Here, "informative" may specifically mean that the alarms are not presented for immediate attention, but kept on file for tracking down problems in the plant that have given rise to the alarms.

It may be determined, for at least one first acquired alarm, whether a physical state of the plant or any part thereof indicated by this alarm has caused the raising of a second alarm that has also been acquired. This determining is based at least in part on the topology of the plant, and/or on the given industrial process, and/or on a physical state of the plant or any part thereof. If said state indicated by the first alarm has caused the second alarm to be raised, then the first alarm is moved from the pool of important alarms to the pool of informative alarms.

The reasoning behind this is that in the context of industrial plants, if a state indicated by a first alarm causes a second alarm to be raised, the likelihood is high that this second alarm represents an escalation of the problem that needs fixing more urgently than the initial problem indicated by the first alarm. A proverb from pre-industrial times says: "For want of a nail, the shoe was lost; for want of a shoe, the horse was lost; for want of a horse, the rider was lost; for want of a rider, the battle was lost; for want of a battle, the kingdom was lost; and all for the want of a nail." This is all the more true in an industrial setting where the recipe of the process explicitly dictates dependencies between successive processing steps, and also between different pieces of equipment.

In the example presented above, the root cause of the closed valve in the input port of the faulty module may have been an over-pressure in a reaction vessel of this faulty module. By virtue of a safety interlock circuit, in response to the over-pressure that has caused a first process alarm to be raised, the valve on the input port of the faulty module was closed. This in turn caused the further process alarms on the output port of the upstream working module to be raised. On top of that, more process alarms may be raised in the faulty module, such as a low mass flow at the input port, an over-temperature in the reaction vessel because this vessel is no longer being cooled sufficiently by this mass flow, and a low mass flow at the output port. The ultimate consequence of the initial fault may be that further downstream, too little of the product to be produced by the faulty module is available, and a service that needs this product comes to a halt for this reason, raising a service alarm.

In this case, what really needs attention is the service alarm because this has the potential to bring the complete process to a halt. To avoid this consequence, the effort for remedy should be focused in exactly this place, as in: "Get more of this substance into this service now, no matter what, and worry about everything else later." The best short-term solution may be totally unrelated to the root cause of the problem. For example, the input port of the module whose service has stopped working may be connected to a different process module that supplies the needed substance, or even to an emergency reservoir of this needed substance, so that the process may continue while the root cause is being tracked down. If the operator had instead been presented the plethora of process alarms, then this might have given rise to a considerably less appropriate reaction, namely starting to work in detail on the faulty module while the plant produces nothing. This may be done later, and the alarms from the pool of informative alarms may then be used to track down the root cause.

The example shows that in particular, each of the acquired alarms may be labeled with a priority, and a first alarm may be moved into the pool of informative alarms if the state indicated by this first alarm has caused a second alarm with a higher priority than the first alarm to be raised. But even if only alarms of the same priority (such as only process alarms) are considered, there is still the tendency that the problem indicated by the second alarm is amplified compared with the problem indicated by the first alarm.

In this example, the best short-term remedy, namely getting the needed substance into the service that is down, would also have been obtained by the very simple method of just moving all process alarms to the pool of informative alarms, keeping only the service alarms in the category of important alarms. But this would eliminate the opportunity to spot any other problems at an early stage before they become big problems. As discussed above, the whole point of having process alarms is to be able to remedy problems before they escalate into the interruption of a service, or even of the industrial process as a whole. By limiting the classifying of alarms as "informative" to alarms that are in a causal chain with an important alarm, salient information in other process alarms is kept, so the signal-to-noise ratio is improved without increasing the propensity of bigger problems developing.

Alternatively or in combination with said classifying based on a causal chain, it may be determined, for at least one acquired alarm, based at least in part on the topology of the plant, and/or on the given industrial process, in combination with a physical state of the plant or any part thereof, whether a predetermined state-dependent condition is met. If this condition is met, then the alarm is moved from the pool of important alarms to the pool of informative alarms. The reasoning behind this is that many conditions which cause a process alarm to be raised are only relevant for the functioning of the industrial process as a whole during certain situations.

In a toy example, for a roll-on, roll-off car ferry, it is certainly advantageous to emit an audible warning on the bridge if the ferry is about to leave port with the big loading door still open. An open door is not a problem while the ferry is moored in port being loaded. Nonetheless, the sensors that register whether the door is open should be working all the time, so that it can be immediately recognized if there is a problem. But the audible alarm should not ring all the time while the ship is moored in port.

By filtering out process alarms that are not relevant due to the situation, unnecessary clutter of alarms is avoided, while the monitoring of the variables within the plant may still be kept active.

For example, while a service alarm for a particular service may normally have a higher priority than process alarms, the service alarm is only relevant for the process as a whole if it occurs at a time where this service is actually needed. There may be many services that are needed only intermittently, so during times where a service is not needed, it does not matter if the state of the plant does not permit the starting of the service.

This is particularly important in a situation where one process module is used in the plant as a shared resource to make products that will be used as educts in different downstream services. For example, one and the same tempering module may be used at one time to heat substance A for use in a first downstream module, and it may be used at another time to cool substance B for use in a second downstream module. At any one time, either the first or the second downstream module may be active, but they can never be active at the same time. Therefore, at any time, there will be a service alarm for one of the two downstream modules, even though the plant is exactly working as intended. Every alarm behind which there is no real problem in the plant is a bad thing because it has a tendency to de-sensitize operators with respect to alarms. The next time an alarm occurs, they may think "well, it's just the one that is always on, no problem", but if they think wrong, they do not react to it when they in fact should.

Both methods of filtering, namely filtering according to causal chains and filtering according to state-dependent conditions, may be used in sequence. The order of the sequence has an influence on the final result and may be chosen according to the concrete needs of the industrial plant under consideration.

For example, in the case of a causal chain of process alarms escalating up to a service alarm, evaluating the causal chain first will cause all the process alarms to be classified as informative alarms, so that only the service alarm will remain as an important alarm. If it is then determined that the service alarm is not important because the service is not currently being used, then all the alarms will be in the pool of informative alarms, and none will remain in the pool of important alarms. If, however, the service alarm is classified as informative only because the service is not currently being used, and then the causal chain of the process alarms is evaluated, then the last process alarm that was raised before the escalation to a service alarm will remain in the pool of important alarms. All other alarms will be in the pool of informative alarms.

In a particularly advantageous embodiment, the determining whether a process alarm has caused a service alarm is based at least in part on a set of rules. Each rule specifies that in response to one or more process alarms, a service alarm is to be raised.

For example, a combined stirring and mixing module that takes in two substances and mixes them by stirring may raise a service alarm for the service "stirring and mixing" if the mass flow of either substance is below a threshold value, if the pressure in the mixing vessel climbs too high, or if the motor current for the stirrer is above a threshold value. For each variable, there may be different process alarms associated with different thresholds. For example, at a first threshold, a "high" process alarm for the pressure may be raised, and at a second, higher threshold, a "high-high" process alarm for the same pressure may be raised. The rule may then stipulate that only a "high-high" pressure will raise a service alarm, so that the service alarm may remain in the pool of important alarms, while the high-high pressure process alarm may be moved to the pool of informative alarms. If the pressure is only high enough to raise a high pressure process alarm, no service alarm may be raised, and the high pressure process alarm may remain in the pool of important alarms.

Rules may also combine several conditions. For example, the overcurrent in the stirrer motor may only cause a service alarm if it persists for a longer time than the motor is designed to tolerate this overcurrent.

The rules in the set of rules may come from any source. In particular, they may be engineered. But preferably, as many rules as possible are generated automatically.

One way to achieve this is to determine, for at least one service or operation of the plant, that this service or operation utilizes at least one resource of the plant. In a modular plant, this resource may reside within the same module, but the resource may also, for example, be another module from which the module that executes the service or operation gets an input. For at least one process alarm that the used resource is able to raise, a rule may then be created that in response to this process alarm being raised, a service alarm is to be raised.

This may be refined in that the process alarm that may cause the raising of a service alarm must specifically relate to a state variable on which the functioning of the service depends. For example, if a service downstream of said stirring and mixing module requires a certain mass flow of stirred and mixed product, a process alarm of the stirring and mixing module that indicates a low output mass flow of the product may cause a service alarm of the downstream service to be raised. But the overcurrent in the stirrer motor does not have an immediate effect on the quality or quantity of stirred and mixed product, so this process alarm may not cause a service alarm for the downstream service to be raised.

Another way to generate rules starts with determining that a service or operation requires a particular state of the plant or any part thereof. Based at least in part on the topology of the plant, and/or on the given industrial process, it is then determined that the raising of a particular process alarm will cause the plant or part thereof to switch to a state that is different from said required state. A rule is then created that in response to said process alarm being raised, a service alarm is to be raised.

For example, the service or operation may require that certain valves be open so that educts may be taken in and certain valves be closed so that the educts cannot escape before the service or operation is finished. But the raising of certain process alarms may immediately alter the configuration of the valves regardless of which configuration is presently needed by the process. For example, if an overpressure in a vessel is detected, a safety circuit may open a valve to relieve the pressure even though this valve was previously closed intentionally for the performing of the service or operation. Also, the process alarm that an enclosure of a module was manually opened may prompt an interlock circuit to switch off certain hazardous components of the module, such as a high-voltage power supply or a laser.

Therefore, it may be specifically determined based at least in part on a safety or interlock function in the topology of the plant that the raising of a particular process alarm will cause the plant or part thereof to switch to a state that is different from said required state.

In a case where the service specifically is a service provided by a process module of a modular industrial plant, the process alarms that may trigger a service alarms of this service may specifically be process alarms that are raised upon a predetermined condition being met within the same process module. Specifically, the process module may be designed to check all conditions for the functioning of the service by sensors of its own, without having to rely on a communication of process alarms from other modules. If the process module is self-contained in this manner, the need for the monitoring of the required variables will not place any further conditions on combinations of this module with other modules. Physical process modules from a given stock on site may then be combined more flexibly.

In particular, at least one rule in the set of rules may be generated based at least in part on metadata of a process module interface. For example, this metadata may be obtained from a Module Type Package, MTP, description of the module that is currently being standardized as VDI standard 2658. This ensures that even if modules from different manufacturers are being combined in the plant, the computerized generation of rules will be able to evaluate the descriptions and draw the right conclusions as to which process alarms may cause the raising of which service alarms.

Specifically, at least one rule may already be built into the metadata of the process module interface (e.g., the MTP). In particular, if a module is self-contained in the sense that it checks all conditions for the functioning of its service on its own as described above, the rules may already be formulated at the time of engineering the module. The module may then be sold complete with the added value of the alarm management, so that no additional work needs to be performed on-site to implement this alarm management.

In a further particularly advantageous embodiment, the determining whether a physical state of the plant or any part thereof indicated by a first acquired alarm has caused a second acquired alarm specifically comprises simulating the behavior of the plant in response to said physical state. In this manner, the filtering of alarms described above may be extended to parts of the plant, such as modules, for which no machine-readable metadata are available. For example, a modular plant may also comprise older modules for which no MTP is available. Also, the topology of the plant may contain interdependencies between modules whose behavior cannot be sufficiently described by pooling the information from the respective MTPs.

For example, a safety or interlock function in the topology of the plant that is external to the modules is not described in any of the MTPs. For example, the factory floor on which a modular plant is assembled from physical process modules may be equipped with a water leakage detector that will shut off the supply of water in case of a leakage.

Therefore, the simulating may specifically include state changes triggered by a safety or interlock function in the topology of the plant in response to the state indicated by the first acquired alarm.

In a further particularly advantageous embodiment, representations of the alarms in the pool of important alarms are rendered on at least one display device. As discussed before, the alarms appearing on the display device are then a clearer and more concise indication for an operator of the plant as to which short-term corrective action shall be taken to keep the plant as a whole functioning, or to return it to a functional state as quickly as possible.

Preferably, in association with a representation of at least one alarm in the pool of important alarms, at least one hyperlink to another alarm that has been moved to the pool of informative alarms by virtue of having caused the important alarm is provided. In this manner, the operator is assisted in tracking down the root cause of the problem that has given rise to the important alarm.

Alternatively or in combination, on the at least one display device, at least one representation of a physical state that has caused the moving of at least one alarm from the pool of important alarms to the pool of informative alarms may be rendered. In this manner, the operator gets an indication why an alarm that he may expect is not being raised.

In the example of the tempering module being used either for heating or for cooling, the representation of the physical state may indicate for which purpose the tempering module is presently being used. The operator then knows that while the module is being used for heating, no alarms relating to cooling will be displayed, and vice versa.

Optionally, a hyperlink to at least one alarm that has been moved to the pool of informative alarms by virtue of a particular physical state may be provided in association with the representation of the physical state. This aids the operator in preparing the plant for a switch to a different physical state in which these alarms become relevant.

For example, if a process is being carried out in a vacuum and the chamber is open for maintenance, then a lot of alarms will not need immediate attention because the process is currently not running anyway. Instead of the alarms, the display may then indicate that the pressure in the chamber is $1*10^{+3}$ mbar. But before pump down, the operator may click on this indication in order to check whether anything needs fixing while the chamber is still open. For example, if one of the process alarms indicates that the filament of an evaporator does not permit the passage of any electrical current, the operator may be reminded of this, saving a disappointment after pump down.

In a further particularly advantageous embodiment, in response to at least one alarm in the pool of important alarms, a control signal is provided to at least one actuator of the plant. The purpose of this control signal is to move the plant towards a physical state in which
- a problem that has given rise to the alarm is mitigated, and/or
- a propensity for damage to the plant in case this problem persists is reduced.

For example, if some substance is missing for operation of a service, then the control signal may serve to switch over to a different source for this substance, such as another module producing this substance or an emergency reservoir for this substance.

A propensity for damage may, for example, be reduced by turning off components that might be damaged if the problem persists or gets worse, or by shutting off one or more valves to contain the problem within a part of the plant.

As detailed above, many of the advantages of the methods are brought about by the computerization of the method. Therefore, the invention also provides a computer program with machine-readable instructions that, when executed by one or more computers, and/or an industrial control system, cause the cone or more computers, and/or the industrial control system, to perform the method described above. The invention also provides a non-transitory computer storage medium, and/or a download product, with this computer program.

LIST OF REFERENCE SIGNS 1 industrial plant
1a operational state of plant 1
1b corrective action for improving operational state 1a
1c physical state of plant 1 or part thereof
2, 2' alarms
2a service alarm
2b process alarm
3a pool of important alarms 2
3b pool of informative alarms 2
4 rules for cause-effect relationships between alarms 2, 2'
5 state-dependent condition for lesser relevancy of alarm 2
10, 10' dosing modules
11, 11' input port of dosing module 10, 10'
12a, 12a' output port of dosing module 10, 10'
12b, 12b' relief port of dosing module 10, 10'
13a valve in input port 11, 11'
13b valve leading to pump 17
13c valve in relief port 12b, 12b'
14a sensor for pressure $p_1$
14b sensor for pressure $p_2$
15 sensor for mass flow f
16 buffer vessel
17 pump in output port 12a, 12a'
100 method
110 acquiring alarms 2
120 determining cause-effect relationships between alarms 2, 2'
121 determining relationship based on rules 4
122 determining utilization of resource
123 connecting process alarms 2b of resource with service alarm 2a
124 determining required state 1c for service
125 determining that process alarm 2a changes state 1c
125a determining 125 based on safety or interlock function
126 connecting process alarm 2b with service alarm 2a
127 generating rules 4 based on process module interface metadata
127a obtaining rules 4 directly from process module interface metadata
128 connecting process alarms 2b, service alarms 2b within module 10, 10'
129 simulating behavior of plant 1
130 moving "cause" alarms 2 to pool 3b
140 determining whether alarm 2 is less relevant due to condition 5
150 moving alarm 2 to pool 3b
160 evaluating operational state 1a, corrective action 1b
170 rendering representations of important alarms 2' in pool 3a
175 providing hyperlinks to alarms 2 in pool 3b
180 rendering representation of state 1c on which condition 5 depends
185 providing hyperlinks to alarms 2 sent to pool 3b for condition 5
190 providing control signal to improve physical state 1c of plant 1

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for determining an operational state of an industrial plant, wherein the industrial plant is configured to execute a given industrial process, the method comprising:
   acquiring a plurality of alarms raised within the plant,
   adding the plurality of alarms to a pool of important alarms;
   determining, based at least in part on a topology of the plant, and/or on the given industrial process, and/or on a physical state of the plant or any part thereof, for at least one first acquired alarm from the plurality of alarms, whether a physical state of the plant or any part thereof indicated by the at least one first acquired alarm has caused a second alarm that has also been acquired, wherein the second alarm represents an escalation of an initial problem indicated by the at least one first acquired alarm that needs fixing more urgently than the initial problem, and when the second alarm is present, moving the at least one first acquired alarm from the pool of important alarms to a pool of informative alarms; and
   determining the operational state of the plant, and/or a corrective action for improving this operational state, based on the alarms in the pool of important alarms.

2. The method of claim 1, further comprising:
   determining, based at least in part on the topology of the plant, and/or on the given industrial process, in combination with a physical state of the plant or any part thereof, for the at least one first acquired alarm, whether a predetermined state-dependent condition is met, and at times when the pre-determined state-dependent condition is met, moving the at least one first acquired alarm from the pool of important alarms to the pool of informative alarms.

3. The method of claim 1, wherein each alarm in the plurality of alarms is labeled with a priority and wherein the second acquired alarm caused by a state indicated by the at least one first acquired alarm has a higher priority than the at least one first acquired alarm.

4. The method of claim 1, wherein the plurality of alarms comprises at least:
   alarms from a first category of service alarms that are raised in response to a service or an operation in the industrial plant being interrupted or being unable to start; and
   alarms from a second category of process alarms that are raised upon a predetermined condition being met for one or more physically acquired variables of the plant or any part thereof,
   wherein the first category of service alarms has a higher priority than the second category of process alarms.

5. The method of claim 4, wherein the service or operation specifically comprises one or more of:
   heating or cooling a substance, and/or keeping the temperature of the substance at a desired value;
   stirring a substance;
   filling at least one vessel with a desired amount of a substance;
   discharging a desired amount of a substance from at least one vessel;
   dosing a desired amount of a second substance into a first substance;
   intermixing a mixture of two or more substances by mechanical interaction with this mixture;
   distilling at least one substance from a mixture of two or more substances;
   transitioning at least one substance; and
   inertizing at least one substance.

6. The method of claim 4, wherein at least one process alarm is specifically raised in response to a temperature, a pressure, and/or a mass flow deviating from a nominal value or going beyond an upper or lower threshold value.

7. The method of claim 4, wherein the determining whether a process alarm has caused a service alarm is based at least in part on a set of rules, wherein each rule specifies that in response to one or more process alarms, a service alarm is to be raised.

8. The method of claim 7, wherein at least one rule in the set of rules is generated by:
   determining that a service or operation utilizes at least one resource of the plant; and
   for at least one process alarm that this resource is able to raise, creating a rule that in response to this process alarm being raised, a service alarm is to be raised.

9. The method of claim 8, wherein the process alarm that the resource is able to raise specifically relates to a state variable on which the functioning of the service depends.

10. The method of claim 7, wherein at least one rule in the set of rules is generated by:
    determining that a service or operation requires a particular state of the plant or any part thereof;
    determining, based at least in part on the topology of the plant, and/or on the given industrial process, that the raising of a particular process alarm will cause the plant or any part thereof to switch to a state that is different from said required state; and
    creating a rule that in response to said process alarm being raised, a service alarm is to be raised.

11. The method of claim 10, wherein it is specifically determined based at least in part on a safety or interlock function in the topology of the plant that the raising of a particular process alarm will cause the plant or any part thereof to switch to a state that is different from said required state.

12. The method of claim 4, wherein at least one service in the industrial plant specifically is a service provided by a process module of the industrial plant, and process alarms that will trigger a service alarm of this service specifically are process alarms that are raised upon a predetermined condition being met within the same process module.

13. The method of claim 12, wherein at least one process alarm is specifically raised in response to a temperature, a pressure, and/or a mass flow deviating from a nominal value or going beyond an upper or lower threshold value, and wherein at least one rule in the set of rules is generated based at least in part on metadata of a process module interface.

14. The method of claim 13, wherein the metadata of the process module interface specifically comprises at least one rule in the set of rules.

15. The method of claim 1, wherein determining whether a physical state of the plant or any part thereof indicated by the at least one first acquired alarm has caused the second acquired alarm specifically comprises simulating a behavior of the plant in response to the physical state.

16. The method of claim 15, wherein the simulating specifically includes state changes triggered by a safety or interlock function in a topology of the plant in response to the state indicated by the at least one first acquired alarm.

17. The method of claim 1, further comprising: rendering representations of the alarms in the pool of important alarms on at least one display device.

18. The method of claim 17, further comprising: providing, in association with a representation of at least one alarm in the pool of important alarms, at least one hyperlink to another alarm that has been moved to the pool of informative alarms by virtue of having caused the important alarm.

19. The method of claim 1, further comprising: rendering, on at least one display device, at least one representation of a physical state that has caused the moving of at least one alarm from the pool of important alarms to the pool of informative alarms.

20. The method of claim 19, further comprising: providing, in association with the representation of the physical state, a hyperlink to at least one alarm that has been moved to the pool of informative alarms by virtue of this state.

21. The method of claim 1, further comprising: in response to at least one alarm in the pool of important alarms, providing a control signal to at least one actuator of the plant, so as to move the plant towards a physical state in which a problem that has given rise to the alarm is mitigated, and/or a propensity for damage to the plant is reduced when the problem persists.

22. The method of claim 1, wherein the at least one first acquired alarm is a process alarm that is raised upon a predetermined condition being met for one or more physically acquired variables, and wherein the second alarm is a service alarm that is raised in response to a service or an operation in the industrial plant being interrupted or being unable to start.

* * * * *